US008644605B2

(12) United States Patent
Bao et al.

(10) Patent No.: US 8,644,605 B2
(45) Date of Patent: Feb. 4, 2014

(54) MAPPING COLORS OF AN IMAGE

(75) Inventors: Sheng Hua Bao, Beijing (CN); Jian Chen, Beijing (CN); Zhong Su, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/572,901

(22) Filed: Aug. 13, 2012

(65) Prior Publication Data

US 2012/0308125 A1 Dec. 6, 2012

Related U.S. Application Data

(63) Continuation of application No. 13/405,399, filed on Feb. 27, 2012.

(30) Foreign Application Priority Data

Feb. 28, 2011 (CN) .......................... 2011 1 0047253

(51) Int. Cl.
*G06K 9/34* (2006.01)
(52) U.S. Cl.
USPC .......................... 382/164; 382/167; 382/278
(58) Field of Classification Search
None
See application file for complete search history.

(56) References Cited

U.S. PATENT DOCUMENTS

| 6,738,161 B1 | 5/2004 | Moriwaki |
| 7,046,858 B2 | 5/2006 | Sobol |
| 7,426,312 B2 | 9/2008 | Dance et al. |
| 2003/0117457 A1 | 6/2003 | Qiao |
| 2008/0181494 A1* | 7/2008 | Watanabe et al. ............. 382/167 |
| 2010/0074553 A1 | 3/2010 | Choi |
| 2010/0110101 A1 | 5/2010 | Relyea et al. |
| 2011/0249910 A1* | 10/2011 | Henderson et al. ........... 382/278 |

OTHER PUBLICATIONS

Ashikhmin, "A tone mapping algorithm for high contrast images", Eurographics Workshop on Rendering, Jun. 2002, pp. 145-156.
Bilcu et al., "A Novel Tone Mapping Method for Image Contrast Enhancement", Image and Signal Processing and Analysis, ISPA 2007, 5th International Symposium, Sep. 27-29, 2007, pp. 266-273.
Grundland et al., "Cross dissolve without cross fade: Preserving contrast, color and salience in image compositing", Computer Graphics Form, 25(3), Sep. 2006, pp. 577-586.
Kabir et al., "Block based Intensity-Pair Distribution for Image Contrast Enhancement", Emerging Technologies, International Conference on ICET '06, Nov. 13-14, 2006, pp. 76-83.

(Continued)

*Primary Examiner* — Tsung-Yin Tsai
(74) *Attorney, Agent, or Firm* — Cantor Colburn LLP; Vazken Alexanian

(57) ABSTRACT

A method and system for mapping colors of an image. The method including the steps of: segmenting an image into a plurality of regions, so that pixels in each of the plurality of regions have a characteristic that meets a predetermined similarity; determining an initial contrast between adjacent regions in the plurality of regions; and transforming an initial color of each of the plurality of regions into a target color; where a target contrast between the adjacent regions in the plurality of regions is equal to or greater than the initial contrast or a difference between the target contrast and corresponding initial contrast is less than a predetermined threshold; and where at least one of the steps is carried out by a computer device.

17 Claims, 10 Drawing Sheets

(56) References Cited

OTHER PUBLICATIONS

Mantiuk et al., "A perceptual framework for contrast processing of high dynamic range images", ACM Trans. Appl. Percept., 2006, pp. 286-306.

Yip et al., "Optimal contrast enhancement for tone-mapped low dynamic range images based on high dynamic range images", Communications, Computers and Signal Processing, IEEE Pacific Rim Conference Aug. 23-26, 2009, pp. 53-58.

* cited by examiner

MAPPING COLORS OF AN IMAGE

CROSS-REFERENCE TO RELATED APPLICATION

This application is a continuation of and claims priority from U.S. application Ser. No. 13/405,399 filed Feb. 27, 2012, which in turn claims priority under 35 U.S.C. §119 from Chinese Patent Application No. 201110047253.0 filed Feb. 28, 2011, the entire contents of both applications are incorporated herein by reference.

BACKGROUND OF THE INVENTION

1. Field of the Invention

The present invention relates to image color mapping technology. More particularly, the present invention relates to a method and apparatus for mapping colors of an image.

2. Description of Related Art

The color mapping technology can be used to apply a color transformation on final image colors. For example, when printing a document, the ink for printing the overall document or the ink for printing a certain color can be saved by performing the color transformation on the image. In addition, for an achromate, if there is a color in the image that cannot be distinguished by the achromate, the color that cannot be distinguished can be transformed into another color that can be distinguished by remapping the colors of the image, so as to assist the achromate in clearly discriminating the image.

The traditional color mapping techniques include color inversion, color replacement, color shift, etc. The color inversion means to invert a color into its inverted color. For example, black is inverted into white, and white is inverted into black. The color replacement means to replace a color with a designated color, for example, red can be replaced with yellow. The color shift means a technique which performs the color transformation by shifting three-primary color components (red, green and blue) of a color by a certain amount.

However, by use of the above color mapping techniques, display quality of the image will be significantly degraded after the colors of the image are re-mapped, thereby affecting the viewer's visual impression.

SUMMARY OF THE INVENTION

Accordingly, one aspect of the present invention provides a method of mapping colors of an image, the method including the steps of: segmenting an image into a plurality of regions, so that pixels in each of the plurality of regions have a characteristic that meets a predetermined similarity; determining an initial contrast between adjacent regions in the plurality of regions; and transforming an initial color of each of the plurality of regions into a target color; where a target contrast between the adjacent regions in the plurality of regions is equal to or greater than the initial contrast or a difference between the target contrast and corresponding initial contrast is less than a predetermined threshold; and where at least one of the steps is carried out by a computer device.

Another aspect of the present invention provides a system for mapping colors of an image, the system including: a segmenting module for segmenting an image into a plurality of regions, so that pixels in each of the plurality of regions have a characteristic that meets a predetermined similarity; a contrast determining module for determining an initial contrast between adjacent regions in the plurality of regions; and a color transforming module for transforming an initial color of each of the plurality of regions into a target color; where a target contrast between the adjacent regions in the plurality of regions is equal to or greater than the respective initial contrast or a difference between the target contrast and corresponding initial contrast is less than a predetermined threshold.

Another aspect of the present invention provides a non-transitory computer readable storage medium tangibly embodying a computer readable program code having computer readable instructions which when implemented, cause a computer to carry out the steps of a method including the steps of: segmenting an image into a plurality of regions, so that pixels in each of the plurality of regions have a characteristic that meets a predetermined similarity; determining an initial contrast between adjacent regions in the plurality of regions; and transforming an initial color of each of the plurality of regions into a target color; where a target contrast between the adjacent regions in the plurality of regions is equal to or greater than the initial contrast or a difference between the target contrast and corresponding initial contrast is less than a predetermined threshold.

Thus, the present invention provides a method and apparatus for mapping colors of an image, which not only can realize the remapping of the colors, but also can make the display quality of the image not be significantly reduced.

DETAILED DESCRIPTION OF THE PREFERRED EMBODIMENTS

It is believed that the above and other objects, features and advantages of the present invention will become more apparent from the following detailed description of the preferred embodiments of the present invention in conjunction with the accompany drawings.

According to an aspect of the present invention, there is provided a method of mapping colors of an image, which comprises: segmenting the image into a plurality of regions, such that pixels in each of the plurality of regions have a characteristic that meets a predetermined similarity; determining an initial contrast between adjacent regions in the plurality of regions; and transforming an initial color of each of the plurality of regions into a target color, such that a target contrast between the adjacent regions in the plurality of regions is equal to or greater than the respective initial contrast or a difference between the target contrast and the corresponding initial contrast is less than a predetermined threshold.

Figure 1:
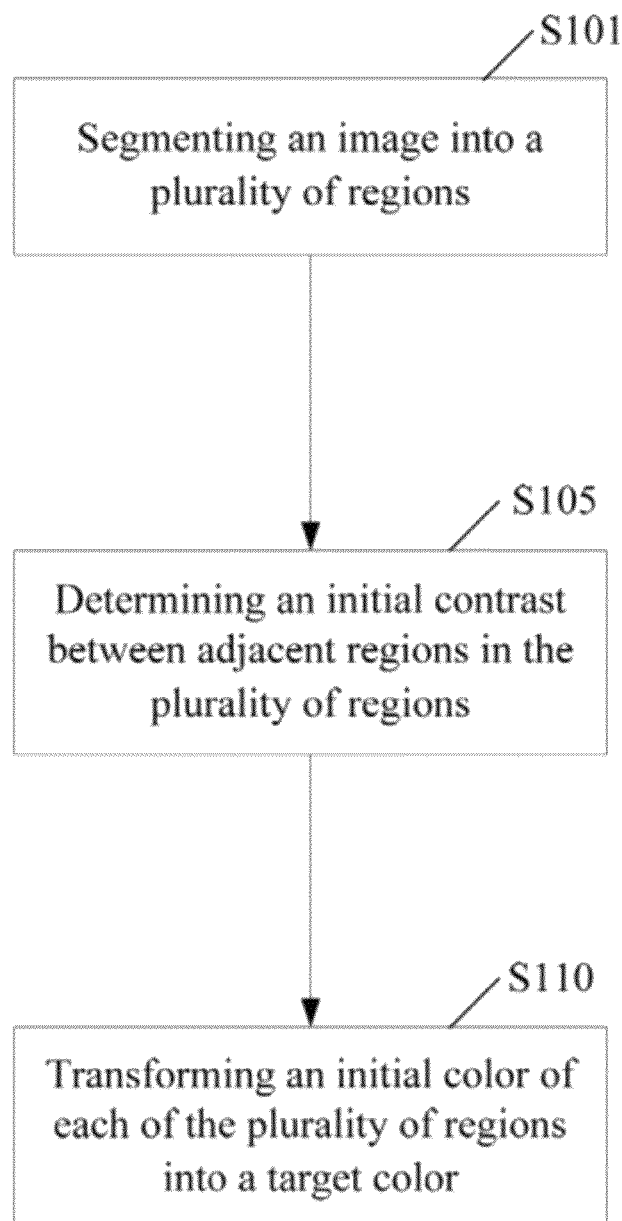
FIG. 1 is a schematic flowchart of a method of mapping colors of an image according to one embodiment of the present invention.

According to another aspect of the present invention, there is provided an apparatus for mapping colors of an image, which comprises: a segmenting module that segments the image into a plurality of regions, such that pixels in each of the plurality of regions have a characteristic that meets a predetermined similarity; a contrast determining module that determines an initial contrast between adjacent regions in the plurality of regions; and a color transforming module that transforms an initial color of each of the plurality of regions into a target color, such that a target contrast between the adjacent regions in the plurality of regions is equal to or greater than the respective initial contrast or a difference between the target contrast and the corresponding initial contrast is less than a predetermined threshold. FIG. 1 is a schematic flowchart of a method of mapping colors of an image according to one embodiment of the present invention. Next, this embodiment will be described in detail in conjunction with the figure.

As shown in FIG. 1, at step S101, the image is segmented into a plurality of regions, such that pixels in each of the plurality of segmented regions have a characteristic that meets a predetermined similarity. The so-called similarity refers to a proximity degree of the characteristic between the pixels. In this embodiment, the characteristic of the pixel can be described using a grey scale value of the pixel, and in this case, the similarity is determined as a threshold which a difference between the grey scale values of any two pixels does not exceed. In addition, texture of the pixel can also be used to describe the characteristic of the pixel, and in this case, the similarity is determined as a threshold which a difference between the texture values of the two pixels does not exceed. The threshold can be set by a user or a person skilled in the art as needed. In this embodiment, the threshold is directly predetermined by the user.

It is well known that image segmentation is a technique that segments an image into a plurality of meaningful regions, in which the segmented regions satisfy the following conditions: 1) the pixels in each region have the same or similar characteristic, for example, the same or similar grey scale value or texture value, thus each region can be represented by one color; 2) the different regions have different or dissimilar characteristics; 3) a set formed by all regions is just the original image; 4) each region is connective.

In this embodiment, after the similarity which the characteristic of the pixels should meet is determined, a Watershed Algorithm will be used to segment the image. The watershed algorithm is a common image segmentation algorithm, and its details can be found at http://en.wikipedia.org/wiki/Watershed_(image_processing). Of course, a person skilled in the art will recognize that other image segmentation algorithms such as region growth algorithm can also be used.

Next, at step S105, an initial contrast between adjacent regions in the plurality of regions is determined. In order not to reduce the contrast of the color mapped image, it is necessary to obtain information about the contrast of the image before the color mapping. In this embodiment, the contrast refers to a color difference between the adjacent regions.

Figure 2:
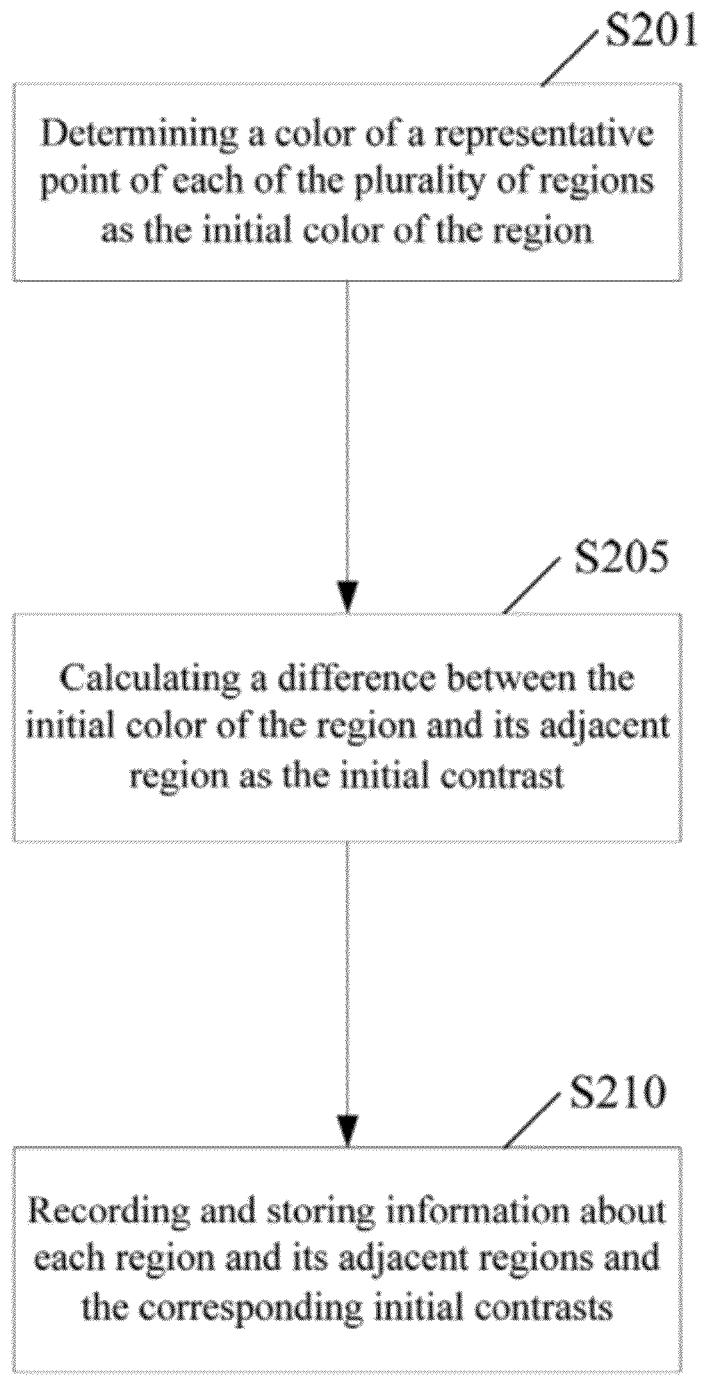
FIG. 2 is a schematic flowchart of the step of determining an initial contrast according to one embodiment of the present invention.

FIG. 2 is a schematic flowchart of the step of determining an initial contrast in this embediment. As shown in FIG. 2, at step S201, first, a color of a representative point (e.g. the centroid point) in each of the plurality of regions is determined as an initial color of the region. Generally, there are many ways to represent the color. For example, the color can be represented by grey scale value, Red-Green-Blue (RGB) value, or Hue-Saturation-Value (HSV) etc. Then, at step S205, a difference between the initial color of the region and its adjacent region is calculated as the initial contrast. If the color is represented by the grey scale value, the difference between the colors is the difference between the grey scale values. Then, at step S210, the information about each region and its adjacent regions and the corresponding initial contrasts are recorded and stored, so that they can be used in the subsequent color transformation process. In this embodiment, the information about the region can include a sequence number of the region.

Then, at step S110, the initial color of each of the plurality of regions is transformed into a target color, such that a target contrast between the adjacent regions in the plurality of regions is equal to or greater than the respective initial contrast or a difference between the target contrast and the corresponding initial contrast is less than a predetermined threshold. In this embodiment, the target contrast is the difference between the target color of the region and its adjacent region. Generally, the target color can be determined based on user's actual requirements. For example, in order for the achromate to clearly discriminate an image, the actual requirement is that red and green cannot coexist in the target color of the image. It is to be noted that a person skilled in the art will appreciate from the present invention that both the method that the target contrast between the adjacent regions in the plurality of regions is equal to or greater than the respective initial contrast and the method that the difference between the target contrast and the corresponding initial contrast is less than a predetermined threshold fall into the protection scope of the present invention. The predetermined threshold can be set by a user or a person skilled in the art as needed.

Figure 3:
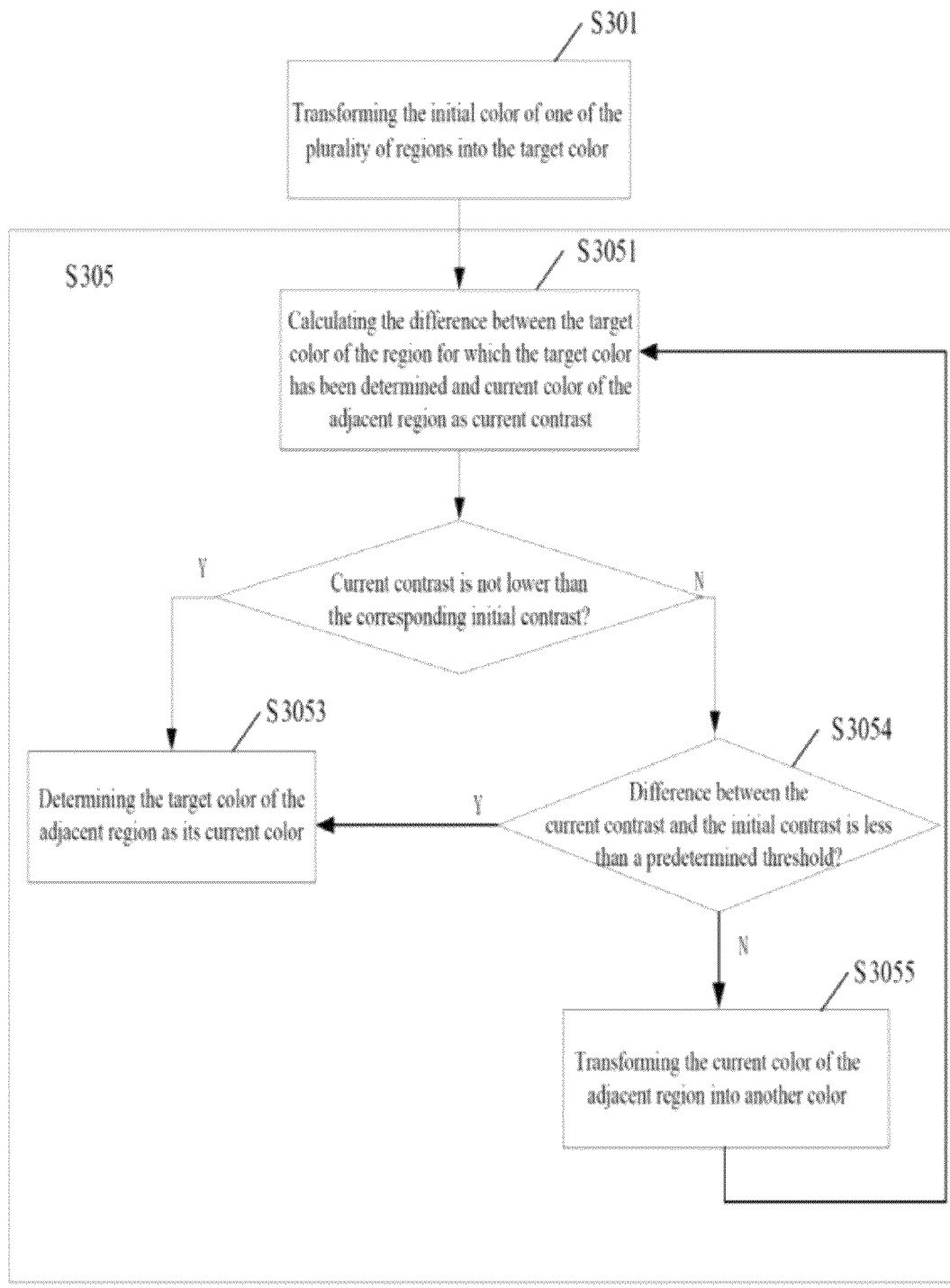
FIG. 3 is a schematic flowchart of the step of transforming an initial color of each of a plurality of regions into a target color according to one embodiment of the present invention.

FIG. 3 is a schematic flowchart of the step of transforming the color in this embedment. As shown in FIG. 3, at step S301, the initial color of one of the plurality of regions is transformed into the target color. Generally, a plurality of reference color sets can be set in advance. Based on the actual requirement, the user can select one proper reference color set from the plurality of reference color sets and select a color therein as the target color of the region. Thus, this region becomes the region for which the target color has been determined.

Then, at step S305, based on the initial contrast between the region for which the target color has been determined and its adjacent region for which the target color has not been determined, the target color of the adjacent region for which the target color has not been determined is determined.

In the embodiment, first at step S3051, for the adjacent region for which the target color has not been determined of the region for which the target color has been determined, the difference between the target color of the region for which the target color has been determined and current color of the adjacent region is calculated as current contrast. Initially, the current color of the adjacent region is the initial color of the adjacent region. Next, at step S3052, it is judged whether the current contrast is equal to or greater than the initial contrast between the region for which the target color has been determined and the adjacent region. If the current contrast is equal to or greater than the initial contrast, the target color of the adjacent region is determined as its current color at step S3053. At this point, the target color of the adjacent region is determined as the initial color. If the current contrast is lower than the initial contrast, it is judged whether the difference between the current contrast and the initial contrast is less than the predetermined threshold at step S3054, where the predetermined threshold is determined by the user. If the difference between the current contrast and the initial contrast is less than the predetermined threshold, the target color of the adjacent region is determined as its current color at step S3055. If the difference between the current contrast and the corresponding initial contrast is equal to or greater than the predetermined threshold, the current color of the adjacent region is transformed into another color at step S3056, and the another color can also be selected from the reference color set. At this point, the current color of the adjacent region is the transformed color, then the process returns to step S3051 to calculate the current contrast, and at step S3052, it is judged whether the current contrast is equal to or greater than the initial contrast. If the current contrast is equal to or greater than the initial contrast, at step S3053, it is determined that target color of the adjacent region is the current color, i.e. the transformed color. If the current contrast is lower than the initial contrast, at step S3054, it is judged whether the difference between the current contrast and the initial contrast is less than the predetermined threshold. If the difference between the current contrast and the initial contrast is less than the predetermined threshold, step S3053 is performed and the target color of the adjacent region is determined as its current color. If the difference between the current contrast and the corresponding initial contrast is equal to or greater than the predetermined threshold, at step S3055, the current color of the adjacent region is transformed again, and step S3051 to step S3055 are repeated, until the target color of the adjacent region is determined.

Similarly, the target colors of other adjacent regions for which the target color has not been determined and the target colors of all the segmented regions can be determined.

It can be seen from the above description that by determining the initial contrasts between the segmented regions and performing the color transformation in a manner that the target contrast between the adjacent regions is equal to or greater than the respective initial contrast or the difference between the target contrast and the corresponding initial contrast is less than the predetermined threshold, the remapping of the colors of the image can be realized without significantly reducing the contrast of the image, thereby keeping the display quality of the image substantially constant.

Next, the method of mapping colors of an image of the embodiment will be explained by an example that an image contains red and green that cannot be discriminated by daltonism. In the example, the predetermined threshold is set as 5. First, the image is segmented into a plurality of (e.g., 3) regions such that each region can be represented by one color, and region 1 is adjacent to region 2, region 2 is adjacent to regions 1 and 3, and region 3 is adjacent to region 2. Next, the initial color of each region is determined, that is, the initial color of region 1 is determined as red, the initial color of region 2 is determined as green, and the initial color of region 3 is determined as blue. Then, the differences between the initial colors of region 1, 2, 3 and their adjacent regions are calculated as the initial contrasts and are recorded and stored, that is, the initial contrast between regions 1 and 2 is 80, the initial contrast between regions 2 and 1 is 80, the initial contrast between regions 2 and 3 is 80, and the initial contrast between regions 3 and 2 is 80. Then, a reference color set {gray, white, black} can be selected based on the actual requirement, namely red and green cannot coexist. The color of region 1 is transformed from red into gray, that is, the target color of region 1 is gray. Next, the current contrast between regions 1 and 2 is calculated as 20. At this point, the current contrast is lower than the initial contrast between regions 1 and 2, and the difference between the current contrast and the initial contrast is 60, which is greater than the predetermined threshold. So the color of region 2 is transformed from green into gray. Then, the current contrast between regions 2 and 1 is calculated as 0, which is lower than the initial contrast between regions 2 and 1, but the difference between the current contrast and the initial contrast is 80, which is also greater than the predetermined threshold. Thus, the color of region 2 needs to be transformed again from gray into white. The current contrast between regions 2 and 1 is calculated as 80. At this point, the current contrast is same as the initial contrast between regions 2 and 1, thus, the target color of region 2 can be determined as white. Then, the current contrast between regions 2 and 3 is calculated as 60, which is lower than the initial contrast between regions 2 and 3, and the difference between the current contrast and the initial contrast is 20, which is greater than the predetermined threshold. Thus, the color of region 3 needs to be transformed and it is transformed into gray. Then, the current contrast between regions 3 and 2 is calculated as 80, which is same as the initial contrast between regions 3 and 2. Thus, the target color of region 3 is determined as gray. With the above operations, the target color of three regions are determined as gray, white and gray respectively, and the target contrast between the adjacent regions is the same as the respective initial contrast.

Figure 4:
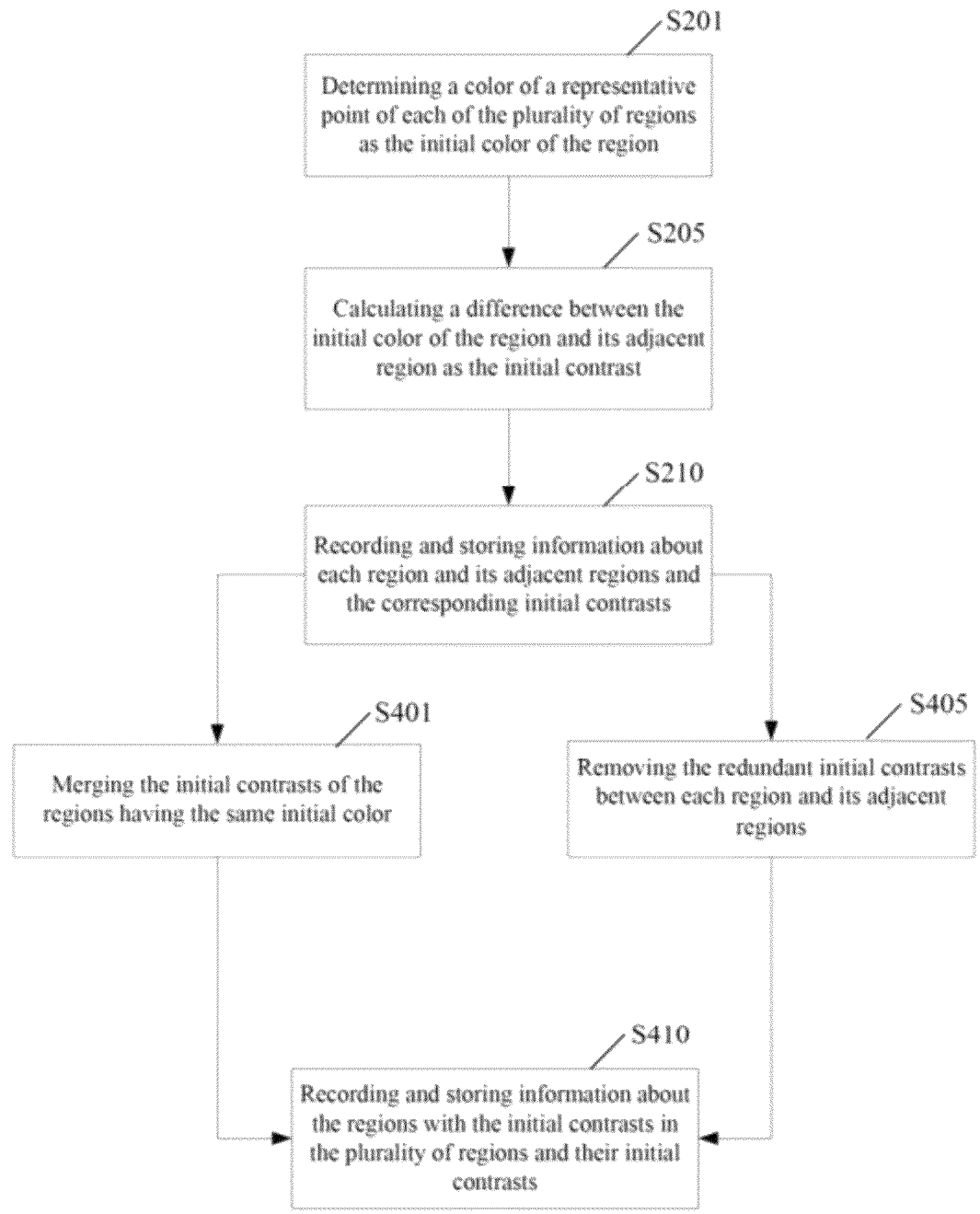
FIG. 4 is a schematic flowchart of the step of determining an initial contrast according to another embodiment of the present invention.

In another embodiment, the initial contrasts recorded and stored in step S210 can be further simplified. As shown in FIG. 4, at step S401, for the regions having the same initial color, the corresponding initial contrasts are merged. Then, at step S405, the redundant initial contrasts between each region and its adjacent regions are removed, and at step S410, the information about the regions with the initial contrasts in the plurality of regions and their initial contrasts are recorded and stored.

Figure 5:
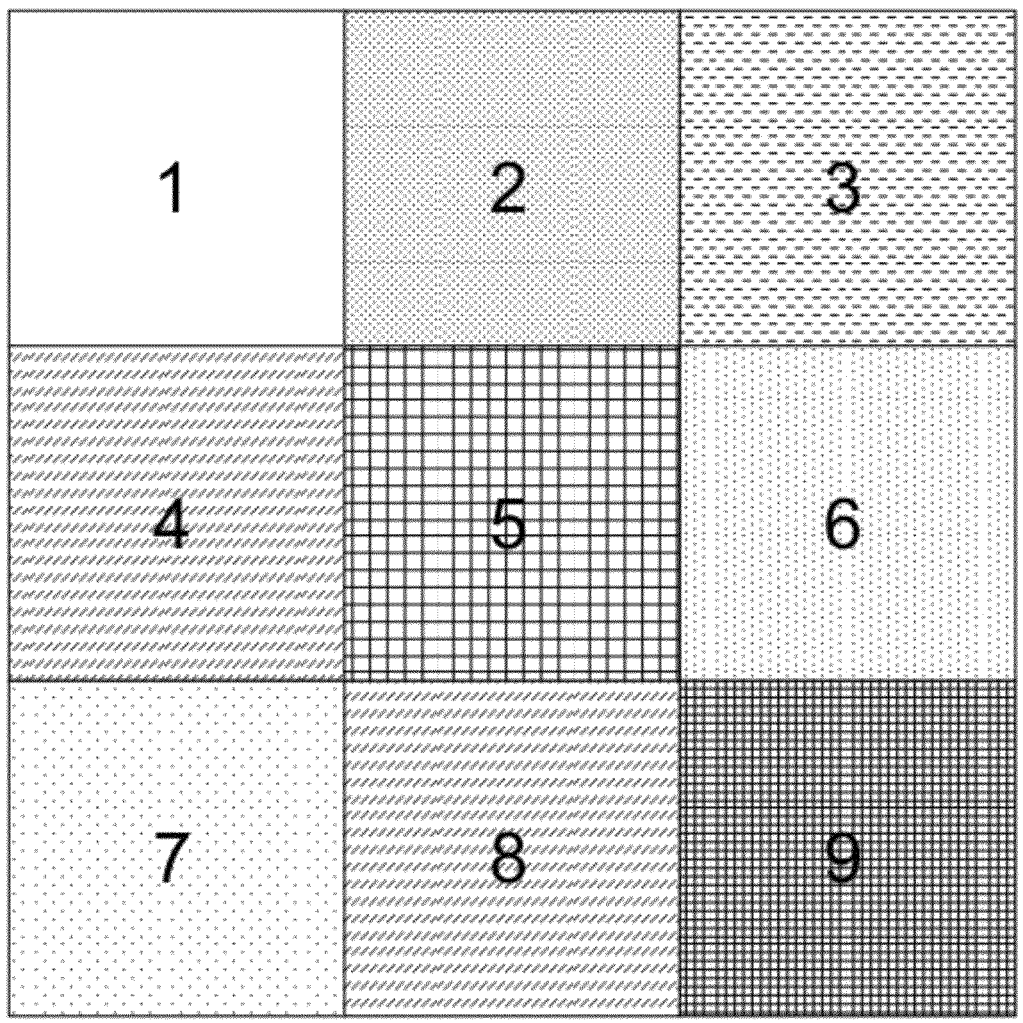
FIG. 5 is a diagram for illustrating an example of simplifying the initial contrasts in FIG. 4.

FIG. 5 illustratively shows a diagram for depicting an example of simplifying the initial contrasts in FIG. 4. As shown in FIG. 5, assume the image is segmented into 9 regions, each region has the initial color, depicted as a shade in FIG. 5, and the initial color of region 4 is same as that of region 8. The initial contrasts between the above regions can be determined by calculating the differences in the initial color between the adjacent regions. In the example of FIG. 5, the initial contrasts between region 1 and regions 2, 4, the initial contrasts between region 2 and regions 1, 3, 5, the initial contrasts between region 3 and regions 2, 6, the initial contrasts between region 4 and regions 1, 5, 7, the initial contrasts between region 5 and regions 2, 4, 6, 8, the initial contrasts between region 6 and regions 3, 5, 9, the initial contrasts between region 7 and regions 4, 8, the initial contrasts between region 8 and regions 5, 7, 9, and the initial contrasts between region 9 and regions 6, 8 are calculated and stored. Since the initial color of region 4 is same as that of region 8, the initial contrasts of regions 4 and 8 are merged. Then, for the redundant initial contrasts, for example, the initial contrast between region 1 and region 2 the initial contrast between region 2 and region 1, and the initial contrast between region 2 and region 3, the initial contrast between region 3 and region 2, etc., one of the initial contrasts is removed. Thus, the simplified initial contrasts between the adjacent regions include: the initial contrasts between region 2 and regions 1, 3, 5, the initial contrasts between region 4 (8) and regions 1, 5, 7, 9, and the initial contrasts between region 6 and regions 3, 5, 9.

Figure 6:
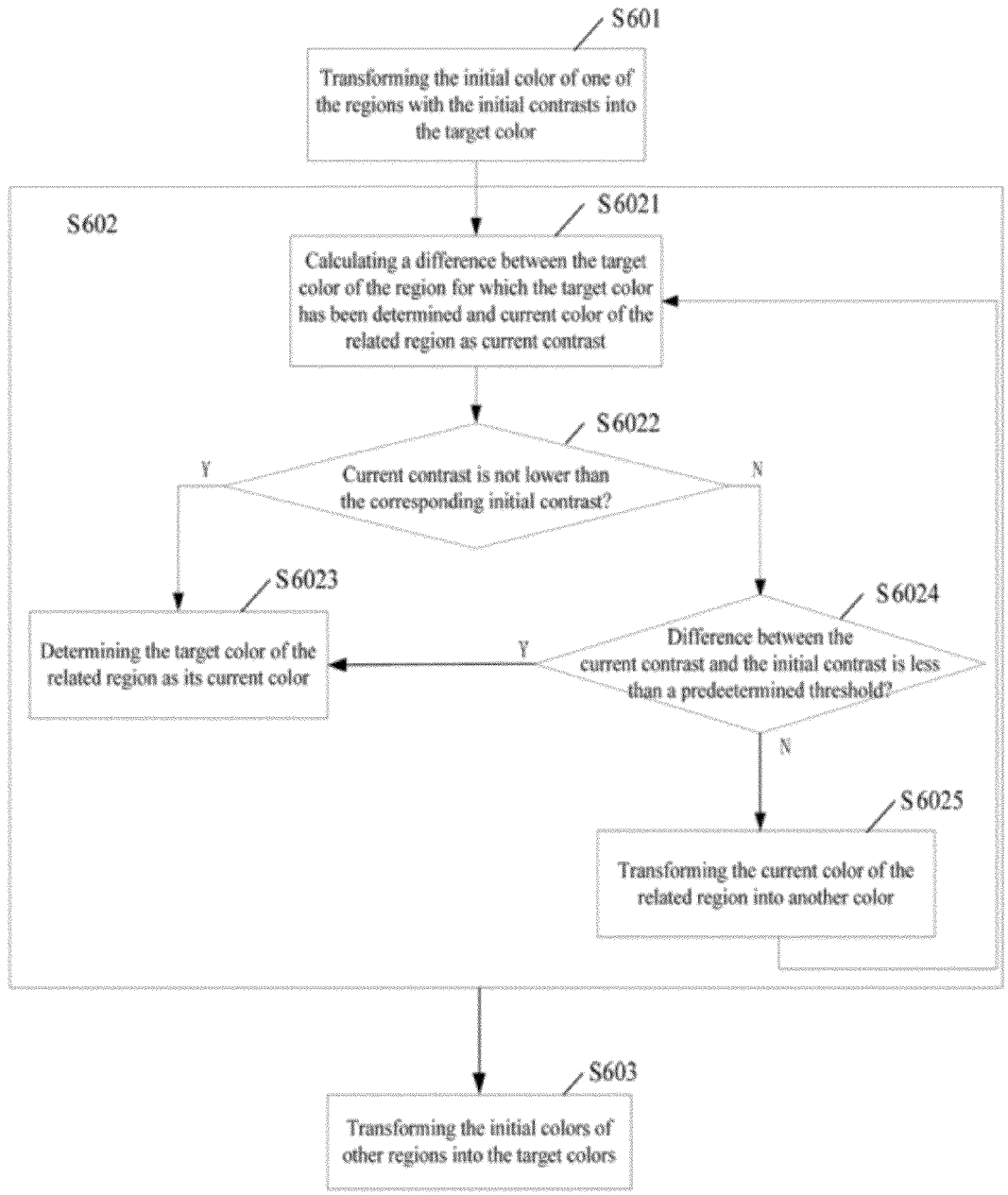
FIG. 6 is a schematic flowchart of the step of transforming an initial color of each of a plurality of regions into a target color according to another embodiment of the present invention.

In this case, when the color transformation is performed on the regions, as shown in FIG. 6, at step S601, the initial color of one of the regions with the initial contrasts is transformed into the target color. As mentioned above, the target color of the region can be selected from a reference color set. Thus, the region becomes the region for which the target color has been determined.

Then, at step S602, the target color of the region related to the region for which the target color has been determined is determined based on the initial contrast between the regions with the initial contrasts. In this embodiment, first at step S6021, the difference between the target color of the region for which the target color has been determined and the current color of the related region for which the target color has not been determined is calculated as the current contrast. Initially, the current color of the related region is the initial color. Then, at step S6022, it is judged whether the current contrast is equal to or greater than the initial contrast between the region for which the target color has been determined and the related region. If the current contrast is equal to or greater than the initial contrast, the target color of the related region is determined as its current color at step S6023. If the current contrast is lower than the initial contrast, it is judged whether the difference between the current contrast and the initial contrast is less than the predetermined threshold at step S6024. If the difference between the current contrast and the initial contrast is less than the predetermined threshold, the target color of the related region is determined as its current color at step S6025. If the difference between the current contrast and the initial contrast is equal to or greater than the predetermined threshold, the current color of the related region is transformed into another color at step S6026, where the another color is also selected from the reference color set. Then, step S6021 and step S6022 are performed, i.e. it is judged whether the newly calculated current contrast is equal to or greater than the initial contrast. If the current contrast is equal to or greater than the initial contrast, the target color of the related region is determined as its current color at step S6023. If the current contrast is lower than the initial contrast, it is judged whether the difference between the current contrast and the initial contrast is less than the predetermined threshold at step S6024. If the difference between the current contrast and the initial contrast is less than the predetermined threshold, the target color of the related region is determined as its current color at step S6023. If the difference between the current contrast and the initial contrast is equal to or greater than the predetermined threshold, the current color of the related region is transformed into another color at step S6025, and step S6021 to step S6025 are performed again, until the target color of the related region is determined. Then, the above steps are repeated for other regions with the initial contrasts, until target colors thereof are determined. For other regions than the regions with the initial contrasts, at step S603, the initial colors thereof are transformed into the target colors selected from the reference color set.

It can be seen from the above description that the method of mapping colors of an image of the present embodiment can further reduce the time for determining the target color of the image by simplifying the initial contrasts between the segmented regions adjacent to each other.

In addition, the above steps for transforming the color is actually the process of solving the target color to be transformed under the conditions that the user's actual requirement is satisfied and the contrasts between each region and its adjacent regions are not significantly reduced, and the dynamic planning method can also be used.

Figure 7:
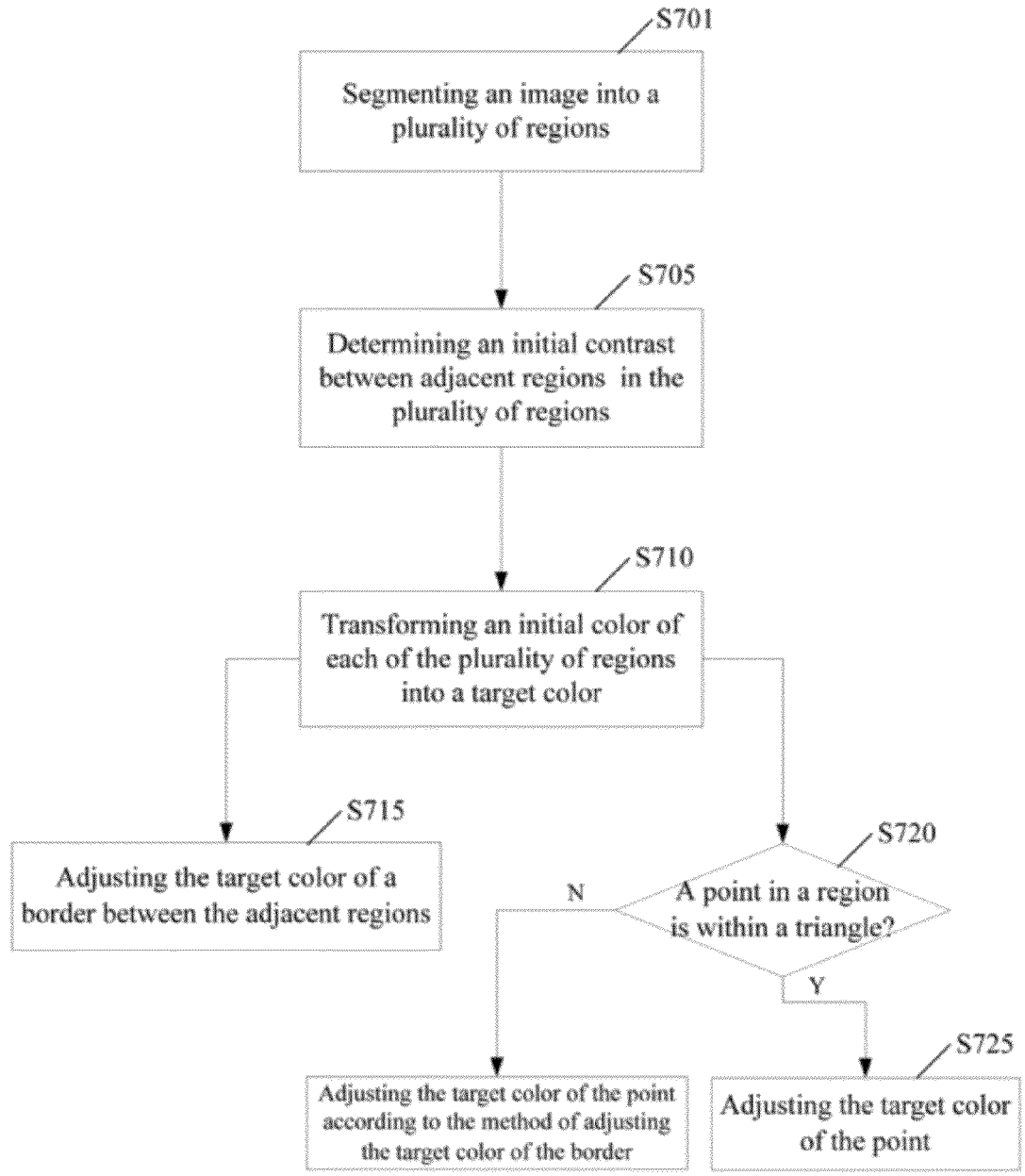
FIG. 7 is a schematic flowchart of a method of mapping colors of an image according to another embodiment of the present invention.

FIG. 7 is a schematic flowchart of a method of mapping colors of an image according to another embodiment of the present invention. Next, the embodiment will be described in detail in conjunction with the figure, where for the same parts as those in the previous embodiments, their description will be properly omitted.

In this embodiment, steps S701 to S710 are the same as steps S101 to S110 in the embodiment shown in FIG. 1 and detailed description thereof will not be given herein.

After the target color of each region is obtained in step S710, further, in order for the transformed color of a border between two adjacent regions to present the same change as the color of the border before the transformation, at step S715, the target color of the border between two adjacent regions is adjusted, such that relationship between the adjusted target color of the border and the target colors of the two adjacent regions is same as relationship between the initial color of the border and the initial colors of the two adjacent regions. In the present embodiment, the relationship between the colors of the adjacent regions can be described by a color difference ratio, that is, the ratio of the differences between the color of a point on the border and the respective colors of the representative points (e.g. the centroid point) in the adjacent regions is constant before and after the color transformation. Of course, a person skilled in the art can appreciate that other methods can be used to reflect the relationship between the colors of the adjacent regions, for example, space-distance ratio of point. In this case, the color of the point on the border can be obtained by performing an interpolation operation based on the space-distance ratio of the point on the border to the representative points of the adjacent regions and based on the colors of the representative points in the adjacent regions.

Specifically, for the point on the border between two adjacent regions, assume the initial colors of the representative points of the two adjacent regions are C1 and C2 respectively, the initial color of the point on the border is C3, the transformed colors of the representative points are $C\_1$ and $C\_2$ respectively, the transformed color of the point on the border is $C\_3$, the relationship is as follows:

$$(C1-C3)/(C2-C3)=(C\_1-C\_3)/(C\_2-C\_3)$$

Alternatively, the color change within a region is kept the same before and after the color transformation. In this case, at step S720, for each point in a region, it is judged whether the point is within a triangle formed by connection lines of the representative points of three adjacent regions including the region where the point is located. If the point is within the triangle, at step S725, the target color of the point is adjusted, such that the relationship between the adjusted target color of the point and the target colors of the representative points of the three adjacent regions is same as the relationship between the initial color of the point and the initial colors of the representative points of the three adjacent regions. If the point is not within the triangle, the target color of the point is adjusted according to the method of adjusting the target color of the border.

Figure 8:
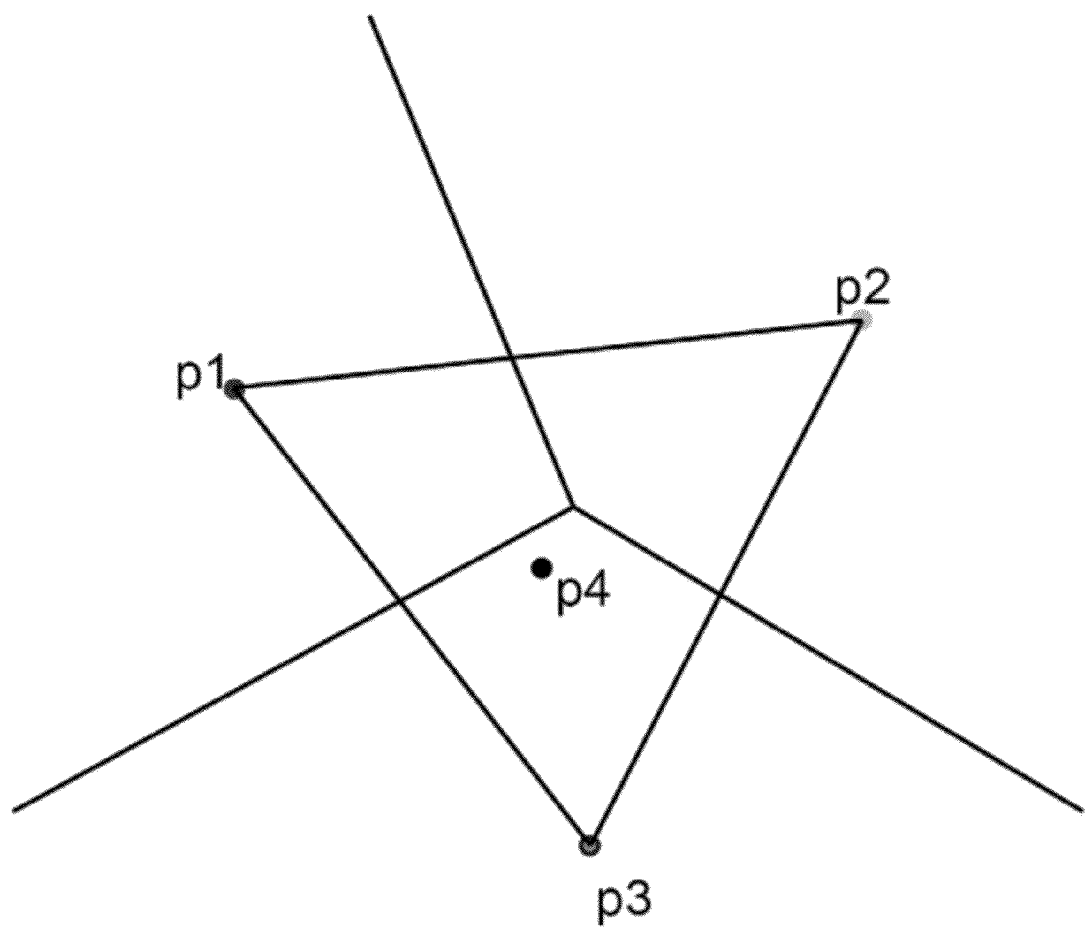
FIG. 8 is a diagram for illustrating an example of adjusting a target color in the embodiment of FIG. 7.

FIG. 8 is a diagram for illustrating an example of adjusting the target color in the embodiment of FIG. 7. Generally, most or all of the points within a region fall within a triangle formed by the representative points of three adjacent regions, and a point that does not fall into the triangle can be regarded as a point on the border between two adjacent regions. FIG. 8 only shows a case in which the point for which the target color is to be adjusted is within the triangle.

As shown in FIG. 8, the point p4 for which the target color is to be adjusted is within the triangle formed by the representative points p1, p2, p3 of three adjacent regions. The initial colors of point p1, p2, p3, p4 are represented by c1, c2, c3, c4 respectively, and the transformed colors are represented by c_1, c_2, c_3 and c_4. Before and after the color transformation, the color relationships between p4 and the representative points p1, p2, p3 are as follows:

$$(c1-c4)/(c2-c4)=(c\_1-c\_4)/(c\_2-c\_4)$$

$$(c2-c4)/(c3-c4)=(c\_2-c\_4)/(c\_3-c\_4)$$

$$(c1-c4)/(c3-c4)=(c\_1-c\_4)/(c\_3-c\_4)$$

Based on the above color relationships, the adjusted target color of point p4 can be acquired.

It can be seen from the above description that the method of mapping colors of an image of the present embodiment enables the respective color-transformed regions to more accurately maintain the color characteristics between the respective regions of the original image by further adjusting the target colors of the regions.

Figure 9:
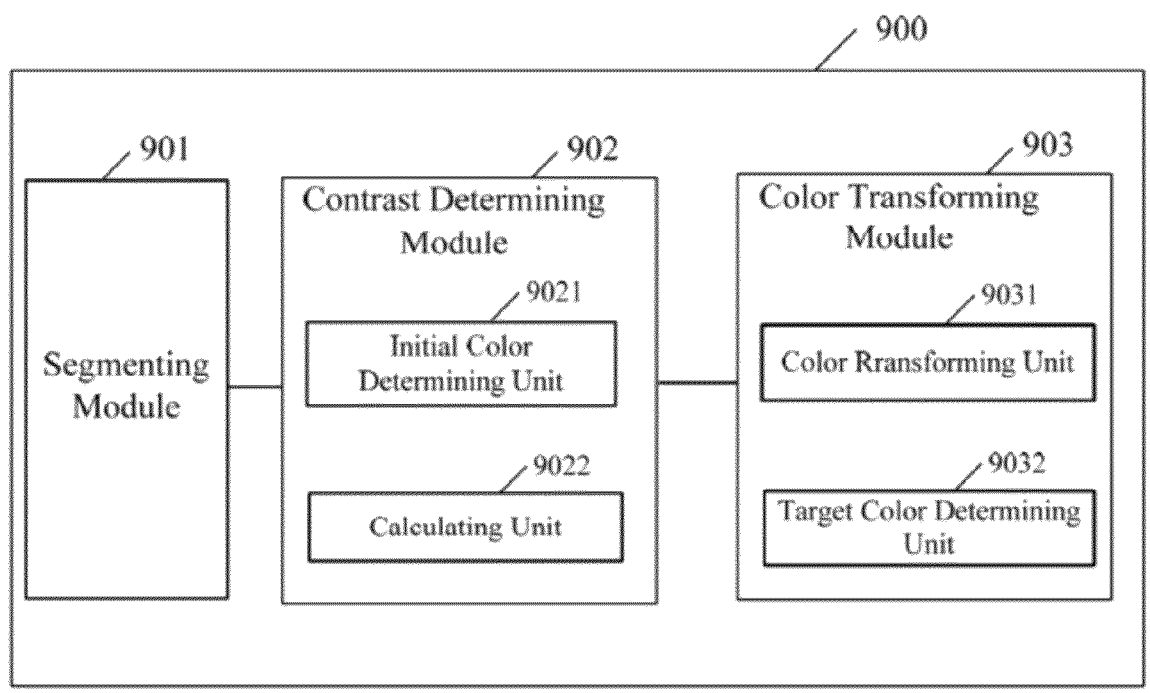
FIG. 9 is a schematic block diagram of an apparatus for mapping colors of an image according to one embedment of the present invention.

Under the same inventive concept, FIG. 9 is a schematic block diagram of an apparatus 900 for mapping colors of an image according to one embodiment of the present invention. Next, the embodiment will be described in detail in conjunction with the figure, where for the same parts as those in the previous embodiments, their description will be properly omitted.

As shown in FIG. 9, the apparatus 900 for mapping colors of an image of the present embodiment includes: a segmenting module 901, which segments the image into a plurality of regions, such that pixels in each of the plurality of regions have a characteristic that meets a predetermined similarity; a contrast determining module 902, which determines an initial contrast between adjacent regions in the plurality of regions; and a color transforming module 903, which transforms an initial color of each of the plurality of regions into a target color, such that a target contrast between the adjacent regions in the plurality of regions is equal to or greater than the respective initial contrast or a difference between the target contrast and the corresponding initial contrast is less than a predetermined threshold.

In the apparatus 900 of this embodiment, the segmenting module 901 can segment the image into a plurality of regions by using an image segmentation algorithm such as the Watershed Algorithm, such that the pixels in each segmented region have the characteristic that meets a predetermined similarity. As described above, the characteristic of the pixel can be described by the grey scale value or texture value of the pixel, and accordingly the similarity can be determined as a threshold which the difference between the grey scale values or texture values of any two pixels cannot exceed.

Then, in the contrast determining module 902, an initial color determining unit 9021 determines a color of a representative point (e.g., the centroid point) of each of the plurality of regions as the initial color of the region, and a calculating unit 9022 calculates the difference between the initial colors of the region and its adjacent region as the initial contrast. As described above, if the color is represented by the grey scale value, the difference between the colors is the difference between the grey scale values. Information about each region and its adjacent regions and the corresponding calculated initial contrasts can be recorded and stored in a recording and storing unit (not shown).

Then, in the color transforming module 903, first, a color transforming unit 9031 transforms the initial color of one of the plurality of segmented regions into the target color. As described above, the target color can be selected from a color reference set selected by the user. At this point, this region becomes the region for which the target color has been determined. Next, a target color determining unit 9032 determines, based on the initial contrast between the region for which the target color has been determined and its adjacent region, the target color of the adjacent region.

Specifically, in the target color determining unit 9032, a calculating unit calculates the difference between the target color of the region and the current color of the adjacent region as the current contrast. Initially, the current color of the adjacent region is the initial color. Next, a judging unit judges whether the calculated current contrast is equal to or greater than the initial contrast between the region and the adjacent region. When the judging unit judges that the current contrast is equal to or greater than the initial contrast between the region and the adjacent region, a determining unit determines target color of the adjacent region as its current color. When the judging unit judges that the current contrast is lower than the initial contrast between the region and the adjacent region, the judging unit further judges whether the difference between the current contrast and the initial contrast is less than a predetermined threshold which can be determined by the user. When the judging unit judges that the difference between the current contrast and the initial contrast is less than the predetermined threshold, the determining unit determines the target color of the adjacent region as its current color. When the judging unit judges that the difference between the current contrast and the initial contrast is equal to or greater than the predetermined threshold, a transforming unit transforms the current color of the adjacent region into another color, then the current contrast is calculated again by the calculating unit and is judged by the judging unit, until the target color of the adjacent region is determined.

In another embodiment, the contrast determining module 902 can further includes: a merging unit which merges the corresponding initial contrasts for the regions having the same initial color; and a removing unit which removes the redundant initial contrasts between each region and its adjacent regions. Then the recording and storing unit records and stores the information about the regions with the initial contrasts in the plurality of the segmented regions and the initial contrasts thereof.

In this case, in the color transforming unit 903, the color transforming unit transforms the initial color of one of the recorded and stored regions with the initial contrasts into the target color, and transforms the initial colors of other regions than the regions with the initial contrasts into the target colors. Then the target color determining unit determines the target color of the region related to the region for which the target color has been determined based on the initial contrast between the recorded and stored regions with the initial contrasts.

Specifically, in the target color determining unit, the calculating unit calculates the difference between the target color of the region for which the target color has been determined and the current color of the related region as the current contrast. Then the judging unit judges whether the calculated current contrast is equal to or greater than the initial contrast between the region for which the target color has been determined and the related region. If the judging unit judges that the current contrast is equal to or greater than the initial contrast between the region for which the target color has been determined and the related region, the determining unit determines the target color of the related region as its current color. If the judging unit judges that the current contrast is lower than the initial contrast between the region for which the target color has been determined and the related region, the judging unit further judges whether the difference between the current contrast and the initial contrast is less than the predetermined threshold. If the judging unit judges that the difference between the current contrast and the initial contrast is less than the predetermined threshold, the determining unit determines the target color of the related region as its current color. If the judging unit judges that the difference between the current contrast and the initial contrast is equal to or greater than the predetermined threshold, the transforming unit transforms the current color of the related region into another color. Then the calculating unit and the judging unit perform the calculation and judgment again, until the target color of the related region is determined.

It should be noted that the apparatus 900 for mapping colors of an image of this embodiment can operatively implement the method of mapping colors of an image shown in FIG. 1.

Figure 10:
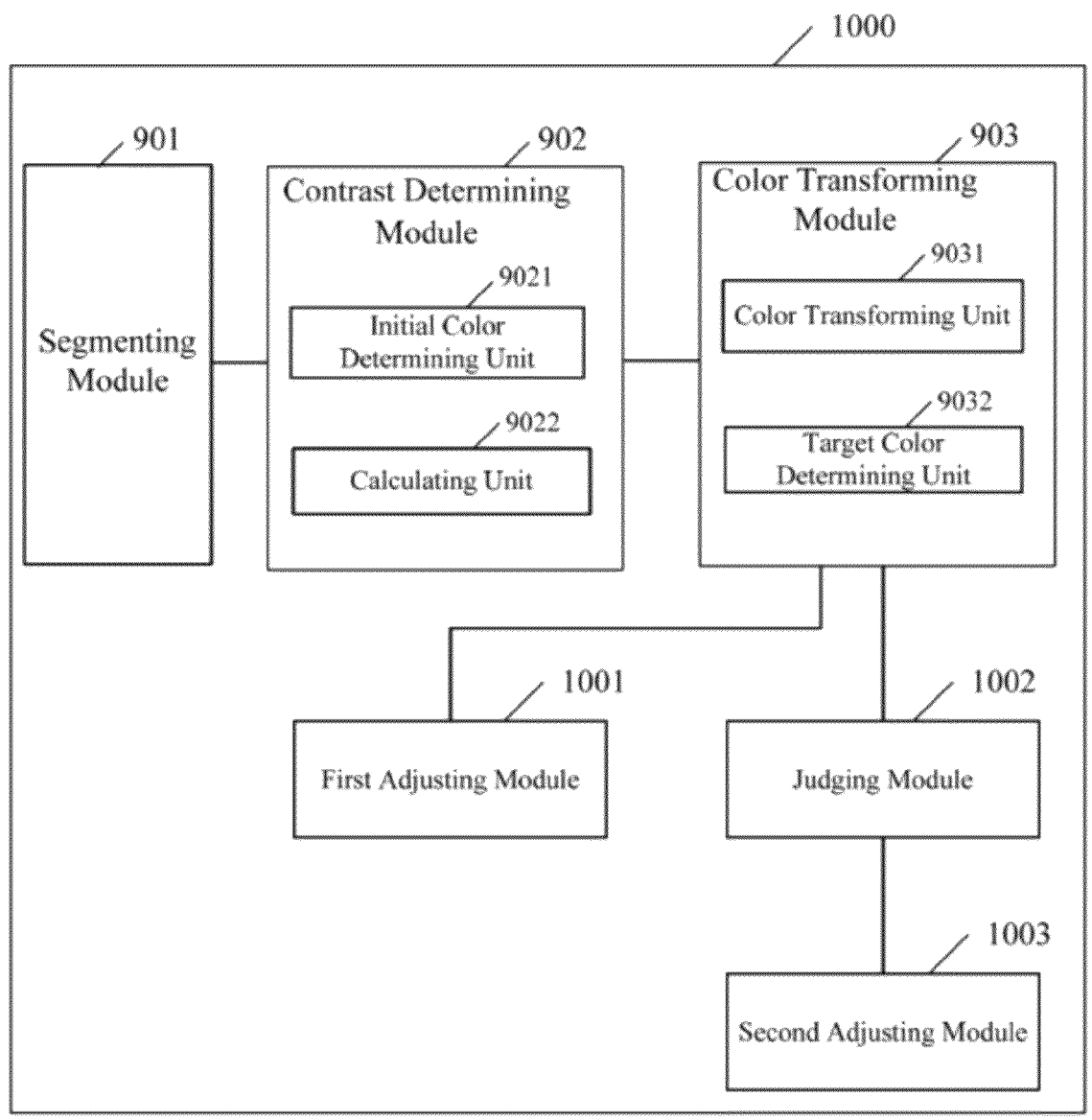
FIG. 10 is a schematic block diagram of an apparatus for mapping colors of an image according to another embodiment of the present invention.

FIG. 10 is a schematic block diagram of an apparatus 1000 for mapping colors of an image according to another embodiment of the present invention. Next, the embodiment will be described in detail in conjunction with the figure, where for the same parts as those of the previous embodiments, their description will be properly omitted.

As shown in FIG. 10, besides the above segmenting module 901, contrast determining module 902 and color transforming module 903, the apparatus 1000 of this embodiment further includes: a first adjusting module 1001 which adjusts the target color of a border between the adjacent regions, such that relationship between the adjusted target color of the border and the target colors of the adjacent regions is same as relationship between the initial color of the border and the initial colors of the adjacent regions. As described above, the relationship between the colors can be described by the color difference ratio. With the first adjusting module 1001, the transformed color of the border between the adjacent regions can present the same change as the color of the border before the color transformation.

In addition, the apparatus 1000 of this embodiment can further include: a judging module 1002, which judges, for each point in the plurality of regions, whether the point is within a triangle formed by connection lines of the representative points of three adjacent regions including the region where the point is located; and a second adjusting module 1003, which adjusts the target color of the point if it is judged by the judging module 1002 that the point is within the triangle, such that the relationship between the adjusted target color of the point and the target colors of the representative points of the three adjacent regions is same as the relationship between the initial color of the point and the initial colors of the representative points of the three adjacent regions.

It should be noted that the apparatus 1000 for mapping colors of an image of this embodiment can operatively implement the method of mapping colors of an image shown in FIG. 7.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for mapping colors of an image, the system comprising:
    a segmenting module for segmenting an image into a plurality of regions including a first region and a second region, wherein the first region is adjacent the second region, and all pixels corresponding to each the first region and the second region have a characteristic that meets a predetermined similarity;
    an initial color determining module for determining a first color of a first representative point of the first region as a first initial color corresponding to the first region and a second color of a second representative point of the second region as a second initial color corresponding to the second region;
    a calculating module for calculating a first initial difference between the first initial color and the second initial color; and
    a transforming module for transforming the characteristic associated with each pixel corresponding to the first region into a first target characteristic and transforming the characteristic associated with each pixel corresponding to the second region into a second target characteristic, wherein a first target difference between the first target characteristic and the second target characteristic is equal to or greater than the first initial difference.

2. The system according to claim 1, wherein the determining module further comprises:
    an initial texture determining module for determining a first texture of a first representative point of the first region as a first initial texture corresponding to the first region and determining a second texture of a second representative point of the second group as a second initial texture corresponding to the second region; and
    the calculating module further calculates a second initial difference between the first initial texture and the second initial texture.

3. The system according to claim 1, wherein the plurality of regions further includes a third region adjacent the second region, the characteristic of all pixels corresponding to the third region meets the predetermined similarity, the initial color determining module further determines a third initial color representative of the third region and calculates a second initial difference between the second initial color and the third initial color, the transforming module further transforms the color associated with each pixel corresponding to the third region into a third target color, a second target difference between the second target color and the third target color being less than the first initial difference, and the transforming module subsequently transforms the color associated with each pixel corresponding to the third region into a fourth target color, a third target difference between the second target color and the fourth target color being equal to or greater than the first initial difference.

4. The system according to claim 3, wherein the initial color determining module further determines that the first initial color is substantially the same as the third initial color, merges the first initial color with the third initial color, and removes a redundant color.

5. The system according to claim 1, wherein the color of all pixels corresponding to each of the plurality of regions meets the predetermined similarity, the initial color determining module further determines an additional initial color representative of each of the plurality of regions and calculates an additional initial difference between each additional initial color and a respective initial color representative of a respective adjacent region, and the transforming module further transforms the color associated with each pixel corresponding to each of the plurality of regions into an additional target color, an additional target difference between the additional target color and a respective target color of the respective adjacent region being equal to or greater than the additional initial difference.

6. The system according to claim 5, further comprising a recording and storing unit for recording and storing information associated with the plurality of regions, including at least one selected from the additional initial color, the additional initial difference, and the additional target color associated with at least one of the plurality of regions.

7. The system according to claim 1, wherein the initial color determining module further determines the first initial color based on a user selection.

8. A system for mapping colors of an image, the system comprising:
    a segmenting module for segmenting an image into a plurality of regions including a first region and a second region, wherein the first region is adjacent the second region, and all pixels corresponding to each the first region and the second region have a characteristic that meets a predetermined similarity;

an initial color determining module for determining a first color of a first representative point of the first region as a first initial color corresponding to the first region and a second color of a second representative point of the second region as a second initial color corresponding to the second region;

a calculating module for calculating a first initial difference between the first initial color and the second initial color; and a transforming module for transforming the characteristic associated with each pixel corresponding to the first region into a first target characteristic and transforming the characteristic associated with each pixel corresponding to the second region into a second target characteristic, wherein a first target difference between the first target characteristic and the second target characteristic is within a predetermined threshold of the first initial difference.

9. The system according to claim 8, wherein the plurality of regions further includes a third region adjacent the second region, the color of all pixels corresponding to the third region meets the predetermined similarity, the initial color determining module further determines a third initial color representative of the third region and calculates a second initial difference between the second initial color and the third initial color, the transforming module further transforms the color associated with each pixel corresponding to the third region into a third target color, a second target difference between the second target color and the third target color being outside the predetermined threshold of the first initial difference, and the transforming module subsequently transforms the color associated with each pixel corresponding to the third region into a fourth target color, a third target difference between the second target color and the fourth target color being within the predetermined threshold of the first initial difference.

10. The system according to claim 8, wherein the characteristic of all pixels corresponding to each of the plurality of regions meets the predetermined similarity, the initial color determining module further determines an additional initial color representative of each of the plurality of regions and calculates an additional initial difference between each additional initial color and a respective initial color representative of a respective adjacent region, and the transforming module further transforms the color associated with each pixel corresponding to each of the plurality of regions into an additional target color, an additional target difference between the additional target color and a respective target color of the respective adjacent region being within the predetermined threshold of the additional initial difference.

11. The system according to claim 10, further comprising a recording and storing unit for recording and storing information associated with the plurality of regions, including at least one selected from the additional initial color, the additional initial difference, and the additional target color associated with at least one of the plurality of regions.

12. The system according to claim 8, wherein the initial color determining module further determines the first initial color based on a user selection.

13. A non-transitory computer readable medium storing the following computer instruction:

first program instructions executable by a processor to cause the processor to segment an image into a plurality of regions including a first region and a second region, wherein the first region is adjacent the second region, and all pixels corresponding to each the first region and the second region have a characteristic that meets a predetermined similarity;

second program instructions executable by a processor to cause the processor to determine a first color of a first representative point of the first region as a first initial color corresponding to the first region and a second color of a first representative point of the second region as a second initial color corresponding to the second region;

third program instructions executable by a processor to cause the processor to calculate a first initial difference between the first initial color and the second initial color; and fourth program instructions executable by a processor to cause the processor to transform the characteristic associated with each pixel corresponding to the first region into a first target characteristic and transforming the characteristic associated with each pixel corresponding to the second region into a second target characteristic, wherein a first target difference between the first target characteristic and the second target characteristic is equal to or greater than the first initial difference or is within a predetermined threshold of the first initial difference.

14. The non-transitory computer readable medium storing the following computer instruction according to claim 13, wherein the plurality of regions further includes a third region adjacent the second region, the characteristic of all pixels corresponding to the third region meets the predetermined similarity, the computer readable storage medium further having stored thereon:

fifth program instructions executable by a processor to cause the processor to determine a third initial color representative of the third region and calculate a second initial difference between the second initial color and the third initial color; and sixth program instructions executable by a processor to cause the processor to transform the color associated with each pixel corresponding to the third region into a third target color, a second target difference between the second target color and the third target color being less than the first initial difference or outside the predetermined threshold of the first initial difference, and transform the color associated with each pixel corresponding to the third region into a fourth target color, a third target difference between the second target color and the fourth target color being equal to or greater than the first initial difference or within the predetermined threshold of the first initial difference.

15. The non-transitory computer readable medium storing the following computer instruction according to claim 13, wherein the characteristic of all pixels corresponding to each of the plurality of regions meets the predetermined similarity, the computer readable storage medium further having stored thereon:

fifth program instructions executable by a processor to cause the processor to determine an additional initial color representative of each of the plurality of regions and calculate an additional initial difference between each additional initial color and a respective initial color representative of a respective adjacent region; and sixth the computer readable storage medium further having stored thereon program instructions executable by a processor to cause the processor to transform the color associated with each pixel corresponding to each of the plurality of regions into an additional target color, an additional target difference between the additional target color and a respective target color of the respective adjacent region being equal to or greater than the additional initial difference or within the predetermined threshold of the additional initial difference.

16. The non-transitory computer readable medium storing the following computer instruction according to claim 15, having stored thereon fifth program instructions executable by a processor to cause the processor to record and store information associated with the plurality of regions, including at least one selected from the additional initial color, the additional initial difference, and the additional target color associated with at least one of the plurality of regions.

17. The non-transitory computer readable medium storing the following computer instruction according to claim 13, having stored thereon fifth program instructions executable by a processor to cause the processor to determine the first initial color based on a user selection.

\* \* \* \* \*